(12) United States Patent
Chen

(10) Patent No.: US 12,151,672 B2
(45) Date of Patent: Nov. 26, 2024

(54) TRANSPORTATION DEVICE HAVING MULTIPLE AXES OF ROTATION AND AUTO-BALANCE BASED DRIVE CONTROL

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 661 days.

(21) Appl. No.: 16/831,786

(22) Filed: Mar. 26, 2020

(65) Prior Publication Data

US 2021/0155227 A1    May 27, 2021

Related U.S. Application Data

(60) Provisional application No. 62/823,661, filed on Mar. 26, 2019.

(51) Int. Cl.
*B60W 30/02* (2012.01)
*B60W 30/14* (2006.01)
*B62K 11/00* (2006.01)
*H02K 7/10* (2006.01)
*H02K 11/33* (2016.01)

(52) U.S. Cl.
CPC .......... *B60W 30/02* (2013.01); *B60W 30/143* (2013.01); *B62K 11/00* (2013.01); *B62K 11/007* (2016.11); *H02K 7/1004* (2013.01); *H02K 11/33* (2016.01)

(58) Field of Classification Search
CPC ..... B60W 30/02; B60W 30/143; B62K 11/00; B62K 11/007; B62K 23/08; B62K 3/002; B62K 2204/00; H02K 7/1004; H02K 11/33; B62J 45/413; B62J 45/42; B62J 45/41; B62D 51/02; B62D 55/06; B62D 61/02; B62M 7/04; B62M 7/12
See application file for complete search history.

(56) References Cited

U.S. PATENT DOCUMENTS

| 10,227,098 B2 * | 3/2019 | Kamen | B60G 17/019 |
| 2014/0188338 A1 * | 7/2014 | Ito | A01D 34/64 |
| | | | 701/41 |
| 2020/0238159 A1 * | 7/2020 | Choi | B62K 11/00 |

FOREIGN PATENT DOCUMENTS

GB    2569657 A * 6/2019 ........... B62K 11/007
WO    WO2019122930 A1 * 12/2017

* cited by examiner

*Primary Examiner* — Maceeh Anwari

(57) ABSTRACT

A transportation device that has two or more wheel axes, auto-balance based drive control, a rider platform that is movable in fore-aft pitch angle, a motor assembly that is movable in fore-aft pitch angle, and a speed reduction mechanism. Various embodiments are presented that include a rider platform that better tracks the slope of an inclined riding surface, a speed reduction mechanism that may rotate in fore-aft (at least in part) with the motor assembly, and the use of separate fore-aft pitch angle and inclination sensors, among other embodiments. Possible forms of the transportation device include a scooter, a skateboard-like device, and a device with continuous tracks.

31 Claims, 5 Drawing Sheets

TRANSPORTATION DEVICE HAVING MULTIPLE AXES OF ROTATION AND AUTO-BALANCE BASED DRIVE CONTROL

CROSS REFERENCE TO RELATED APPLICATIONS

This application claims the benefit of U.S. Provisional Application No. 62/823,661, filed Mar. 26, 2019, entitled Rider-Balancing Vehicle with Two Wheel Axes, and having the same inventor(s) as above.

FIELD OF THE INVENTION

The present invention relates to vehicles that use an auto-balancing system to control vehicle drive and, more specifically, to multi-wheel axis vehicles that employ auto-balancing.

BACKGROUND OF THE INVENTION

Various vehicles are known in the art that use auto balancing and they include the Segway, Solowheel and Hovertrax, taught in U.S. Pat. Nos. 6,302,230; 8,807,250; and 8,738,278, respectively, which are hereby incorporated by reference.

In these devices, there is generally one principal axis of rotation. The vehicle performs auto-balancing by speeding up or slowing down in an attempt to bring the platform surface of the vehicle to a steady-state balanced position.

The present invention provides a device with multiple axes of rotation, one forward of the other, such as a front wheel and a rear wheel. A movable rider platform with an associated position sensor permits a user to control the vehicle by leaning forward or rearward. The device is configured to attempt to bring the rider platform into steady state balance, accelerating when the platform is tilted to a greater degree and decelerating as the rider platform is tilted less.

This produces a vehicle where platform movement can be independent of the position of the vehicle (or vehicle frame). Thus, it is the rider balance, not the vehicle balance, that is used in a feedback loop to control speed.

Multiple axes auto-balance driven vehicles have several advantages over single axis auto-balance vehicles. One is that they can travel faster (compare a scooter to a Solowheel or Segway). Another is that they can carry heavier loads. Yet another is that they are generally more stable, easier to ride and safer. However, in auto-balance driven vehicles in which the rider platform can move independently of the main body of the vehicle or the vehicle frame, it is possible for the rider platform to unwantedly come into contact with other parts of the vehicle when the riding surface is inclined or declined. Thus, there is a need in two-axis auto-balance vehicles to provide a rider platform which is configured to continuously adjust its neutral pitch angle in response to changes in incline of the riding surface so that there is always adequate distance between the rider platform and other parts of the vehicle or ground.

SUMMARY OF THE INVENTION

Accordingly, it is an object of the present invention to provide a transportation device that has two (or more) axes of rotation, auto-balance based speed control, and a rider platform which adjusts its auto-balancing pitch angle to follow the incline of the riding surface.

It is another object of the present invention to provide scooter- or skateboard-like devices having auto balance based drive control that are designed to enable the rider platform to adjust its pitch angle according to the incline of the riding surface.

It is also an object of the present invention to provide continuous track transportation devices having auto balance based drive control that are designed, electronically and/or mechanically, to enable the rider platform to adjust its pitch angle according to the incline of the riding surface.

These and related objects of the present invention are achieved by use of a transportation device having multiple axes of rotation and auto-balance based drive control as described herein.

The attainment of the foregoing and related advantages and features of the invention should be more readily apparent to those skilled in the art, after review of the following more detailed description of the invention taken together with the drawings.

DETAILED DESCRIPTION

Figure 1:
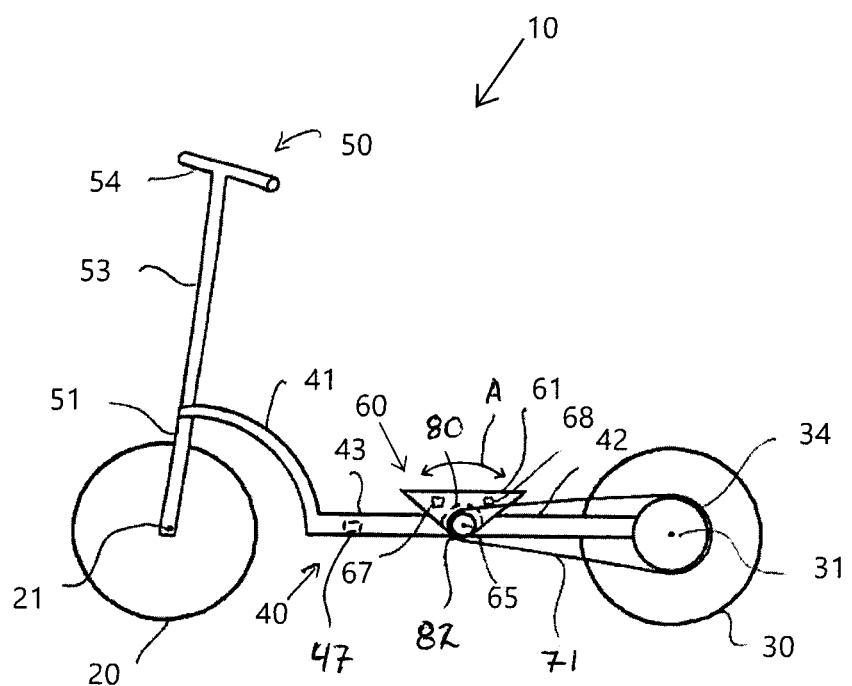
FIG. 1 is a side view of an embodiment of a scooter device having an auto-adjusting dynamically balanced rider platform.

Referring to FIG. 1, one embodiment of a two-axis scooter device 10 in accordance with the present invention is shown. Scooter 10 may include a front wheel 20 and a rear wheel 30 arranged in line, each with an axis of rotation 21, 31, respectively. A connecting frame 40 is preferably coupled between the wheels. In the embodiment of FIG. 1, connecting frame 40 has a curved section 41 about a portion of front wheel 20 and a flatter or straighter section 42 extending from the curved section to the rear wheel. A handlebar structure 50 may ascend from the front wheel. It may include forks 51 coupled to the front wheel, a steering shaft 53 and a steering handle 54, as known in the art.

A platform structure 60 is preferably mounted on connecting frame 40 and configured for fore-aft rotational movement. Platform structure 60 may include a rider platform 61 disposed towards a top surface thereof. The rider platform is preferably mounted about a pivot axis 65 for fore-aft movement as indicated, for example, by arrow A, and may include a drive motor 80 having a rotor and a stator. The rotor is coupled to a drive head 82 which in turn drives a belt or chain 71 that drives a complementary drive wheel assembly 34. Drive wheel assembly 34 may include a wheel, sprocket, cassette with gears or other. Rotation of drive wheel assembly 34 turns rear wheel 30. Motor 80 may include a speed reduction system.

Platform structure 60 preferably includes a fore-aft tilt position sensor 67, which is preferably a gyroscopic sensor, and a control circuit 68. The gyroscopic sensor may detect the fore-aft tilt position of the platform, relatively to horizontal. The control circuit drives the drive motor and hence rear wheel 30 to dynamically balance rider platform 61 based on the fore-aft tilt angle (i.e., pitch) sensed by the position sensor, as known for auto-balancing vehicles such as those disclosed in U.S. Pat. Nos. 8,807,250 and 8,738,278, issued to Chen. Motor 80 may have a drive axis that is collinear with the axis of rotation of the platform, or be otherwise arranged.

Unlike self-balancing vehicles of the prior art having only a single wheel axis wherein the wheel or parallel wheels are driven to balance the entire vehicle, the device of FIG. 1 has two wheel axes (one forward of the other, as shown), and wheels 20,30 are both in contact with the riding surface. The main body of the vehicle will thus be inclined upward or downward when riding on inclined surfaces. To prevent platform structure 60 from unwantedly coming into contact with other parts of the vehicle when riding on inclines, control circuit 68 may be configured to automatically adjust its neutral pitch to match the incline of the riding surface instead of having a horizontal position as its neutral pitch at all times. In this way, the rider platform is dynamically balanced to an inclined pitch angle whenever the riding surface is inclined, and will therefore maintain adequate distance from other parts of the vehicle. This may be achieved by providing a surface incline position sensor (preferably an accelerometer) 47 on a rigid part of the device which does not undergo fore-aft pitch changes relative to the riding surface, such as connecting frame 40. This surface incline position sensor measures the position of the vehicle as it follows the riding surface, and provides vehicle position data for the control circuit 68 to use as a reference to adjust the neutral pitch angle of the rider platform to follow the incline of the riding surface.

Figure 2:
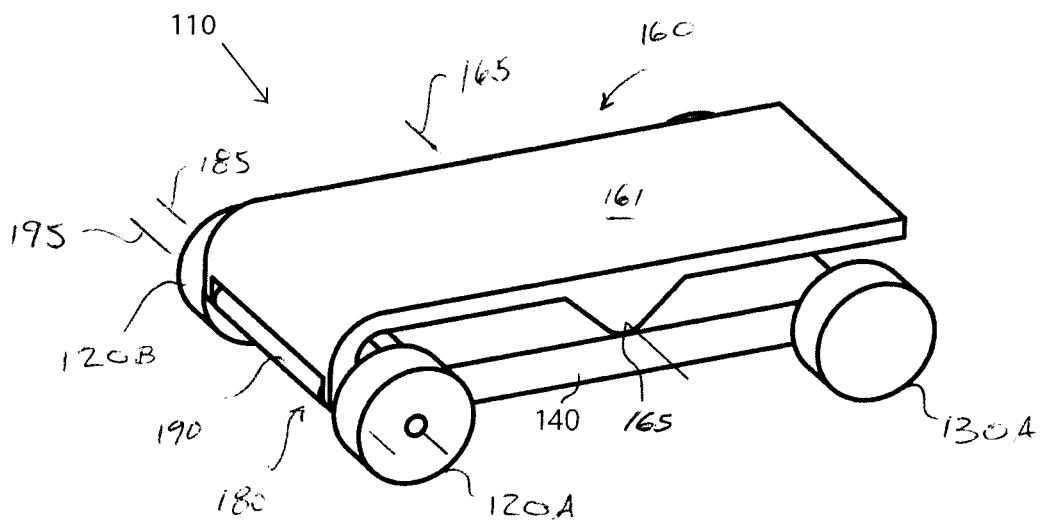
FIG. 2 is a perspective view of an embodiment of a skateboard-like device having an auto-adjusting dynamically balanced rider platform.
Figure 3:
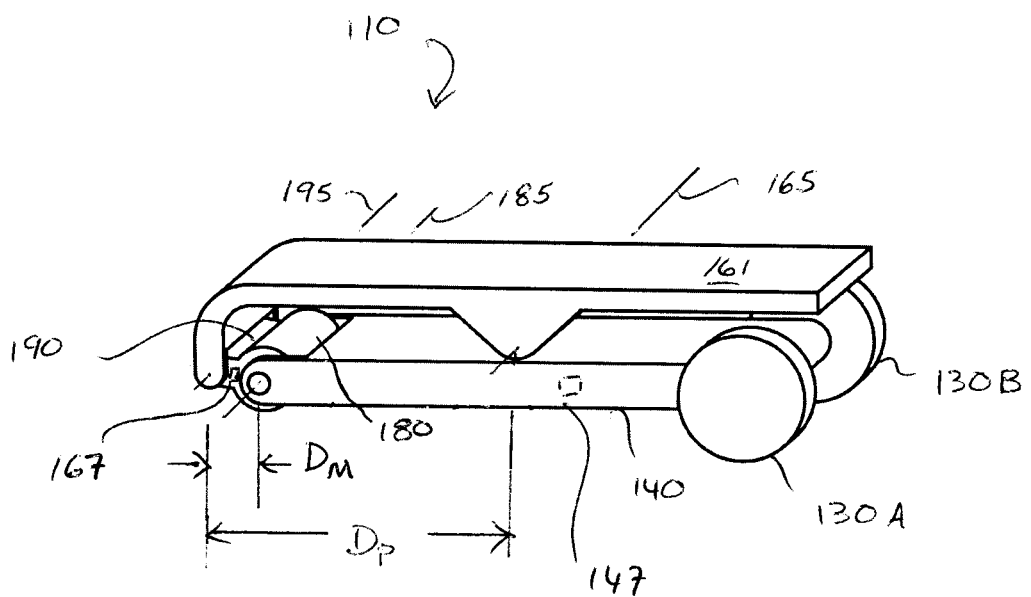
FIG. 3 is another perspective view of the embodiment of FIG. 2 with front wheels removed.

FIGS. 2-3 show another embodiment of a two-axis skateboard-like device 110 in accordance with the present invention. In FIG. 3, wheel 120A is removed so that the motor and control mechanism are more visible.

The embodiment includes a motor assembly having a motor 180 and a motor arm 190. Motor 180 is mounted separately from rider platform 161, yet motor 180 is linked to rider platform 161 through motor arm 190, the rider platform and motor arm being pivotally coupled at axis 195. Rider platform 161 is further mounted to connecting frame 140 in a manner that affords fore-aft pivotal movement of the platform relative to the frame, as was the case with rider platform 61 of FIG. 1. Rider platform 161 may pivot at a platform axis 165.

Motor arm 190 mechanically links rider platform 161 to motor 180 so that when rider platform 161 tilts forward or backward, its change in position translates to corresponding up or down movement of motor arm 190 and thus fore or aft rotation of motor arm 190 and motor 180 (about a control or motor axis 185). To accommodate changes in the relative angles and distance between different parts of device 110 during these actions, platform pivot point 165 may be configured to slide along connecting frame 140 in conjunction with the tilting of rider platform 161. As noted elsewhere herein, various gear arrangements may be provided at the output of motor 180 and as known may impact the alignment or position of fore-aft pitch control axis 185.

Low-friction material can be provided at the sliding contact area, or a roller with bearings may be provided on pivot point 165. Alternatively, the pivot point 165 can be pivotably connected to connecting frame 140 instead of being slidable, and rider platform 161 may have a portion which is flexible enough to allow forward and backward rotation of motor arm 190 and motor 180 while pivot point 165 remains in place.

Motor 180 can drive the front wheel(s), the rear wheel(s), or both through a transmission. In other embodiments, there may be a first motor driving the front wheels and a second motor driving the rear wheel(s), in which case both motors can be pivotably connected to the rider platform.

A fore-aft pitch position sensor 167, which may be a gyroscopic sensor, is preferably provided with motor 180 and/or motor arm 190 to sense the fore-aft pitch angle of these components. A control circuit, similar to control circuit 68 of FIG. 1, is preferably connected to motor 180 and drives the motor based on data from position sensor 167, as taught elsewhere herein.

Because the length of motor arm 190 is much shorter than the length of rider platform 161, any fore-aft pitch angle change of the rider platform 161 relative to connecting frame 140 causes a more significant fore-aft pitch angle change in motor arm 190. Thus, depending on the relative lengths of the rider platform and the motor arm, a change in the pitch angle of the rider platform may leads to a significantly larger change in the pitch angle of the motor and motor arm. This allows rider platform 161 to remain substantially aligned with the connecting frame and the riding surface, yet still be able to affect an adequate change in fore-aft tilt of the position sensor to drive device 110.

In general, the distance, Dp (distance platform), between the platform axis 165 of the rider platform and connection axis 195 between the rider platform and the motor is longer than the distance, Dm (distance motor), between the motor axis 185 and the connection axis 195. This is a mechanical arrangement that allows for the adjustment of the pitch angle of rider platform 161 in a manner that avoids the rider platform unwantedly coming into contact with other parts of the vehicle when riding on an inclined surface. It can be seen in FIG. 3 that the distance Dp is greater than the distance Dm. It can further be seen that Dp is at least twice Dm and that it may be 3, 4, 5 or more times greater than Dm.

Another way to achieve auto-adjustment of the neutral balancing pitch of the rider platform in response to inclined riding surfaces is to provide a surface incline position sensor 147 on a non-pivoting and non-sliding part of the device, such as on connecting frame 140, to provide data about the incline of the riding surface for automatically adjusting the neutral pitch of rider platform 161 according to the incline of the riding surface as described for device 10 of FIG. 1.

Figure 4:
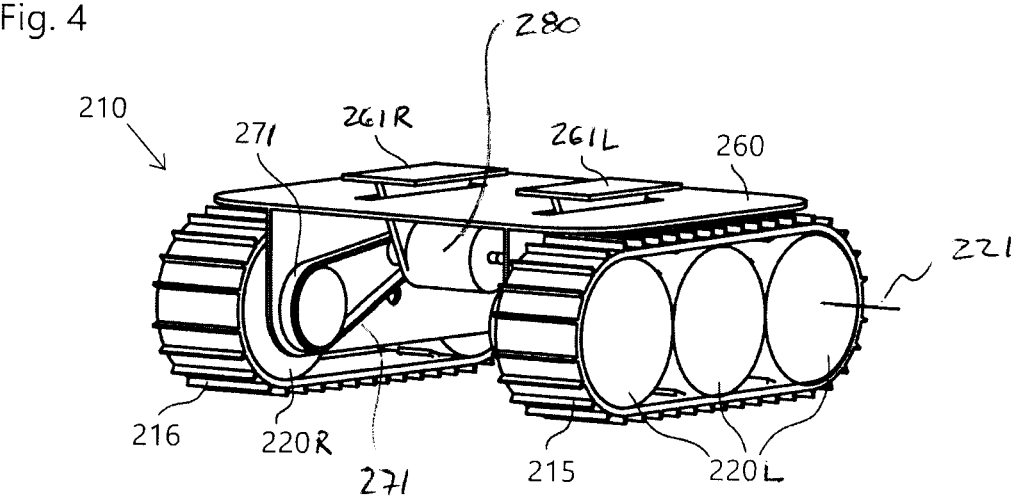
FIG. 4 is a perspective view of an embodiment of a continuous track device having an auto-adjusting dynamically balanced rider platform.

FIG. 4 shows another embodiment of a device 210 in accordance with the present invention. Device 210 includes three pairs of wheels 220L, 220R arranged in parallel pairs, each with an axis of rotation 221. Other embodiments may have a different number of wheels, and although this embodiment has each wheel's axis collinear with an opposing wheel's axis, other embodiments may have wheels which are otherwise arranged.

The wheels 220L on one side of the vehicle are connected by a left continuous track 215, and the wheels 220R on the other side are connected by a right continuous track 216. The device of this embodiment is bidirectional and thus left and right (L,R) are chosen arbitrarily, yet other embodiments may be directional and have a designated forward direction and rearward direction.

Wheels 220 are driven by drive motors 280 and in turn drive the tracks (similar to a tank, bulldozer or tractor). Two drive motors are provided, one to drive at least one of the left-side wheels 220L, and the other to drive at least one of the right-side wheels 220R. The motors can drive the wheels through belts, chains, gears or other methods. There may be speed reduction provided between the motors and the wheels. Differential wheel and track driving can be achieved to provide turning. The tracks 215,216 are shown below a platform frame 260.

The platform frame 260 has two movable rider platform sections 261L, 261R provided therein. These rider platform sections are placed within and pivotably coupled to platform frame 260, and are capable of tilting in the fore-aft dimension independently of each other and of platform frame 260. Each rider platform section 261L, 261R includes a position sensor. A control circuit and the position sensors preferably function as discussed elsewhere herein. Each rider platform section includes or is coupled to one of the two drive motors. In this embodiment, the output driving axle of the motor is collinear with the rider platform section's fore-aft pivoting axis. Other embodiments may have alternative configurations in which the motor's driving axle is not collinear with the rider platform section's pivoting axis.

In use, the movable rider platform sections 261L, 261R may be tilted forward or backward independently and relative to the platform frame 260. The drive motors are configured to independently drive the left and right wheels to achieve independent driving of tracks 215,216 to dynamically balance each rider platform section based on their respective fore-aft tilt angles. The fore-aft tilt position of the left rider platform section 261L controls the left side wheels (and motor) and the fore-aft tilt position of the right rider platform section 261R controls the right side.

Figure 5:
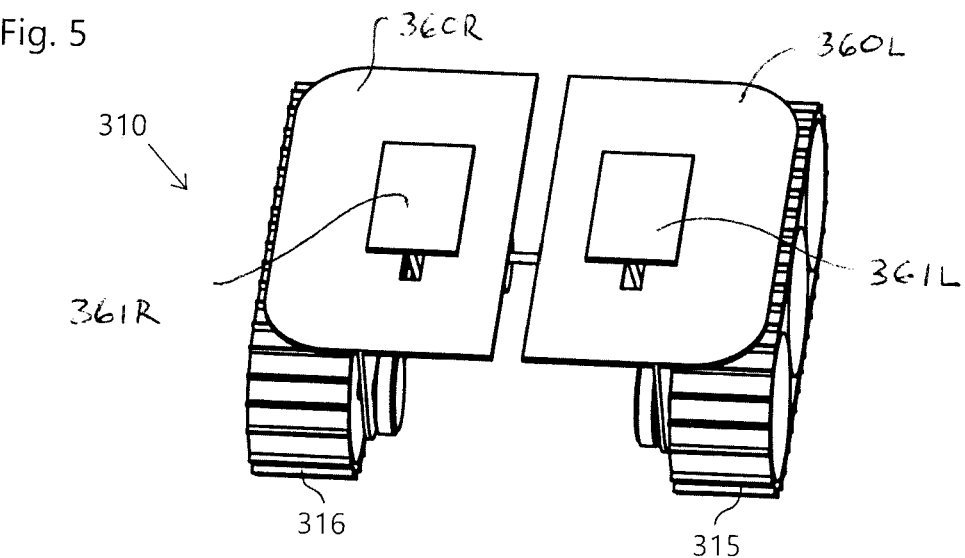
FIG. 5 is another perspective view of the embodiment of FIG. 4.
Figure 6:
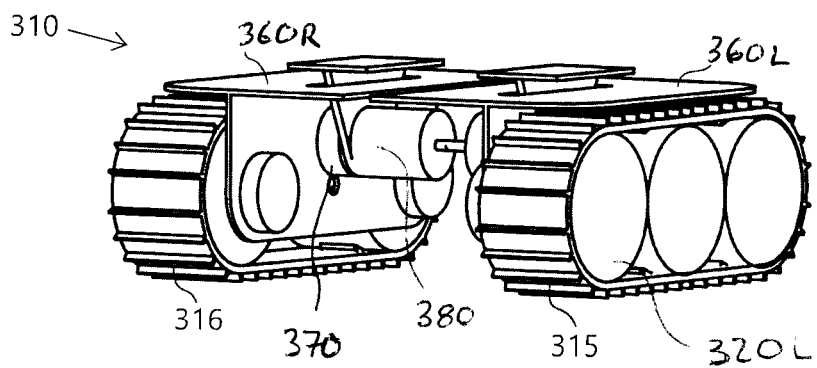
FIG. 6 is an embodiment of another continuous track device having an auto-adjusting dynamically balanced rider platform.

FIGS. 5-6 show another embodiment of a device 310 in accordance with the present invention. This embodiment is similar to the device of FIG. 4, except that the platform frame is divided into a left platform frame 360L and a right frame 360R, pivotably coupled to one another so that the platform frames may pivot in the fore-aft dimension relative to each other to independently follow the incline of the riding surface on their respective sides of the vehicle. The left wheels 320L are coupled to left platform frame 360L and the right wheels 320R are coupled to right platform frame 360R. This configuration allows the left and right continuous tracks 315,316 to accommodate differently angled ground surfaces. The connection between left and right platform frames 360L, 360R may be achieved with mechanically pivoting joints, or by a slightly flexible connecting structure without discrete joints or pivot points.

Various other motor configurations and wheel arrangements are possible without departing from the present invention. For example, the vehicle can have any number and distribution of wheels as long as there are at least two non-collinear wheel axes; the motor or multiple motors may be configured to drive any one or more of the wheels; and the wheels can have continuous tracks or can be without continuous tracks.

In order for the rider platform sections to each adjust its neutral pitch according to the incline of the riding surface as described for the device of FIG. 1, left and right surface incline position sensors (as discussed elsewhere herein) may be provided for the left and right sides of the platform frame, respectively. Alternatively, the connection between their respective rider platform sections and the motors may be configured similarly to those described in FIGS. 2-3 and 7-8.

Since the embodiments of FIGS. 4-6 may be heavy, the rider's weight may not provide sufficient force for effectively tilting the rider platform sections forward and backward against the force needed to drive the vehicle. To solve this problem, any motor speed reduction which has been provided (gears, for example) may be reduced and/or moved outside of the rider platform sections. This will reduce the force needed to tilt the rider platform sections. Different distributions of speed reduction between the rider platform sections and the wheels can increase or decrease the counter-force from the motor. For instance, if more stages of gears are provided in the wheels and less stages of gears are put in the rider platform sections, less rider weight will be required to tilt the rider platform sections.

For example, referring to FIG. 6, the motors 380 (with or without speed reduction) may drive respective gearboxes 370 that are placed outside of the rider platform sections through a shaft (that is obscured from view). The speed reduction can be achieved using gears, a belt (e.g., belt 271 in FIG. 4), friction, or other methods.

Figure 7:
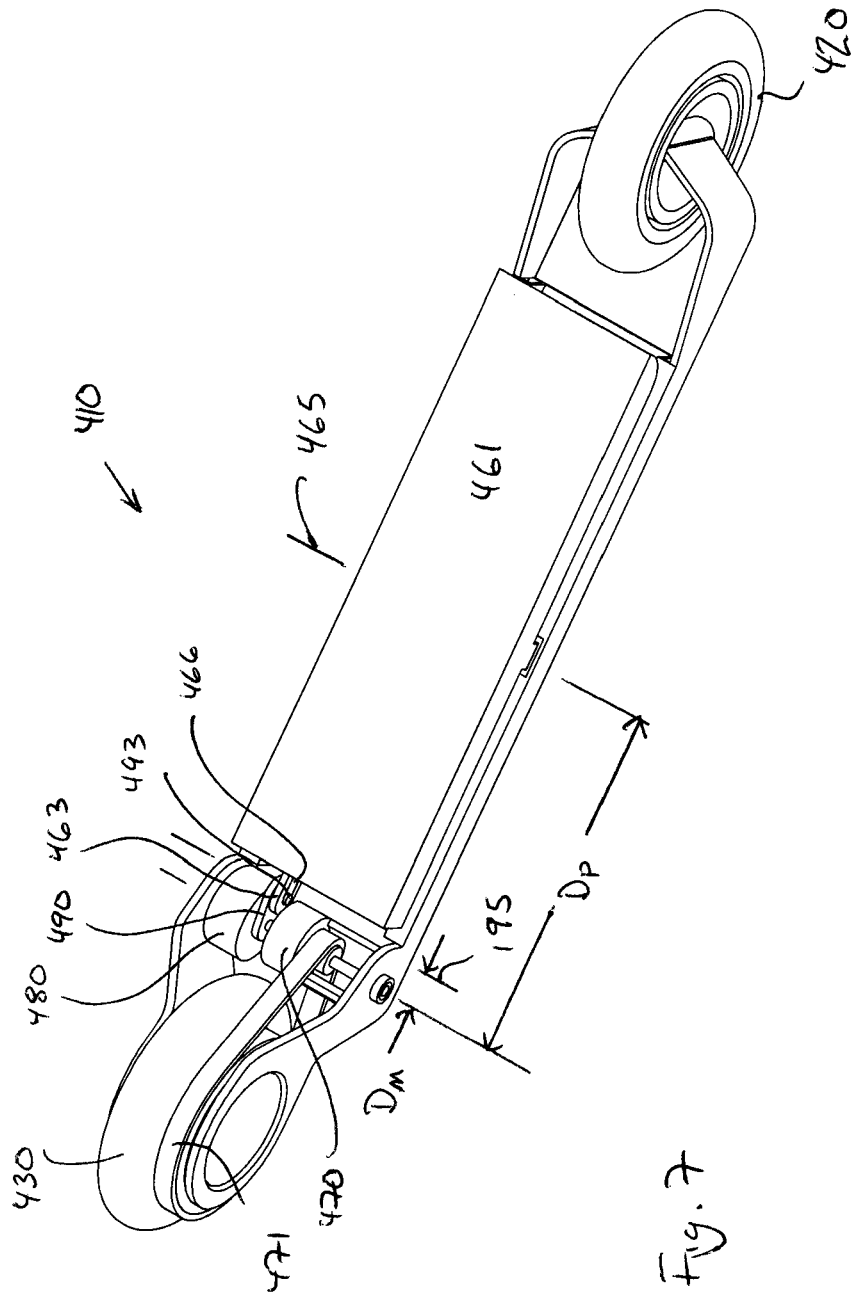
FIG. 7 is a perspective view of another embodiment of a scooter device having an auto-adjusting dynamically balanced rider platform.

FIG. 7 shows another embodiment of a scooter device 410 in accordance with the present invention. Scooter device 410 includes a motor assembly having a motor 480 and a motor arm 490, and a rider platform 461 disposed between wheels 420,430. Rider platform 461 is capable of tilting in fore-aft pitch angle. Motor 480 drives wheel 430 through a gear speed reduction (inside gearbox 470). Rider platform 461 is connected to motor 480 through a motor arm 490 coupled to motor 480, and a platform arm 463 coupled to rider platform 461. Motor arm 490 is coupled to motor 480 at one end and at its other end has a pin 494 which is capable of sliding within a slot 466 provided within platform arm 463. This arrangement links tilting of the rider platform to the motor so that they undergo pitch changes in unison, while pin 494 slides within slot 466 to accommodate changes in distance between the rider platform and the motor.

Figure 8:
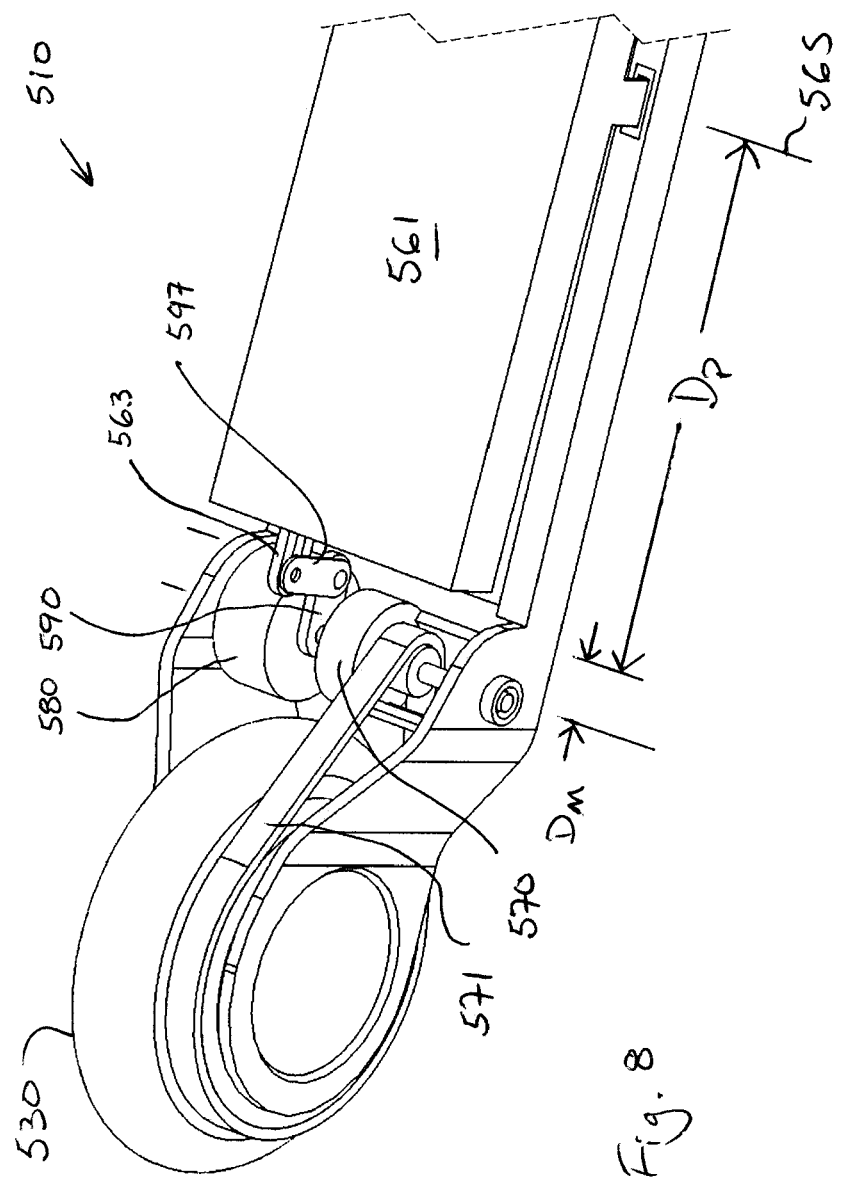
FIG. 8 is a perspective view of another embodiment of a scooter device having an auto-adjusting dynamically balanced rider platform.

FIG. 8 shows yet another embodiment of a scooter device 510 in accordance with the present invention. Scooter device 510 is similar to the embodiment of FIG. 7, but instead of a pin-and-slot design, it has an additional connecting arm piece 597 coupled at one end to motor arm 590 and at its other end to platform arm 563. This is an alternative to the sliding pin-and-slot design of FIG. 7 and accomplishes the same function of accommodating changes in distance between the motor and the platform during tilting actions.

Suitable batteries and their placement are known in the art, though the battery may be placed under the platform and/or coupled to the frame, etc.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:

1. A transportation device, comprising:
   a first wheel;
   a second wheel, positioned forward or rearward of the first wheel;
   a rider platform that is movable in fore-aft pitch angle;

a motor assembly that is movable in fore-aft pitch angle, the motor assembly including a motor that drives at least one of the first and second wheels;
a position sensor that senses fore-aft pitch angle; and
a control circuit coupled to the position sensor and the motor that drives the motor based on data from the position sensor;
wherein the rider platform is coupled to the motor assembly such that movement in the fore-aft pitch angle of the rider platform causes greater movement in the fore-aft pitch angle of the motor assembly.

2. The device of claim 1, wherein:
the rider platform is movable in fore-aft pitch angle about a platform axis;
the motor assembly is movable in fore-aft pitch angle about a control axis; and
the rider platform and the motor assembly are movably coupled to one another at a coupling axis that is non-colinear with the platform and control axes.

3. The device of claim 2, wherein the distance from the platform axis to the coupling axis, Dp, is greater than the distance from the control axis to the coupling axis, Dm; and
wherein the arrangement of the rider platform and the motor assembly, and their coupling, is configured to achieve the greater movement in fore-aft pitch angle of the motor assembly in response to movement in fore-aft pitch angle of the rider platform.

4. The device of claim 3, wherein Dp is twice Dm or greater.

5. The device of claim 3, wherein Dp is four times Dm or greater.

6. The device of claim 2, wherein the position sensor is associated with the motor assembly such that the position sensor moves about the control axis in a manner corresponding to movement of the motor assembly about the control axis.

7. The device of claim 1, further comprising a speed reduction mechanism coupled between the motor and the one of the first and second wheels driven by the motor, that reduces a speed of rotation output by the motor and delivers a lower speed of rotation to the one of the first and second wheels driven by the motor.

8. The device of claim 7, wherein the speed reduction mechanism includes a a portion that is located outside of the motor assembly.

9. The device of claim 7, wherein the speed reduction mechanism is coupled to the motor such that the speed reduction mechanism rotates in fore-aft, at least in part, as the motor assembly rotates in fore-aft.

10. The device of claim 7, wherein the speed reduction mechanism is coupled to the motor such that, at least in part, the speed reduction mechanism does not rotates in fore-aft as the motor assembly rotates in fore-aft.

11. The device of claim 1, further comprising:
a frame structure to which the first and second wheels are coupled; and
an inclination sensor that senses a fore-aft inclination of the frame structure;
wherein the control circuit is coupled to the inclination sensor and drives the motor based on data from the position sensor that is offset by data from the inclination sensor.

12. The device of claim 1, further comprising a continuous mechanical member coupled to the one of the first and second wheels driven by the motor and configured to translate rotational movement from that wheel into movement of the device.

13. An auto-balance controlled transportation device, comprising:
a first wheel and a second wheel, one arranged forward of the other;
a motor that drives at least one of the first and second wheels;
a rider platform that has a movable fore-aft pitch angle, movable about a platform axis;
a motor assembly that has a movable fore-aft pitch angle, movable about a control axis;
a position sensor that senses fore-aft pitch angle; and
a control circuit that drives the motor based on data from the position sensor;
wherein the rider platform and the motor assembly are movably coupled to one another at a coupling axis;
wherein the distance from the platform axis to the coupling axis, Dp, is greater than the distance from the control axis to the coupling axis, Dm; and
wherein the coupling arrangement of the rider platform and the motor assembly is such that movement in fore-aft pitch angle of the rider platform causes a greater movement in fore-aft pitch angle of the motor assembly.

14. The device of claim 13, wherein Dp is three times Dm or greater.

15. The device of claim 13, wherein the movable coupling of the rider platform and the motor assembly is achieved by a mechanical linkage.

16. The device of claim 13, wherein the motor assembly includes a motor arm that extends from the motor to the place of movable coupling to the rider platform, and wherein the position sensor senses a fore-aft pitch angle of at least one of the motor and the motor arm.

17. The device of claim 13, further comprising a speed reduction mechanism coupled between the motor and the one of the first and second wheels driven by the motor, that reduces a speed of rotation output by the motor and delivers a lower speed of rotation to the one of the first and second wheels driven by the motor;
wherein the speed reduction mechanism is coupled to the motor such that at least a portion of the speed reduction mechanism is located outside of the motor assembly.

18. The device of claim 13, further comprising a speed reduction mechanism coupled between the motor and the one of the first and second wheels driven by the motor, that reduces a speed of rotation output by the motor and delivers a lower speed of rotation to the one of the first and second wheels driven by the motor;
wherein the speed reduction mechanism is coupled to the motor such that the speed reduction mechanism, at least in part, does not rotates in fore-aft as the motor assembly rotates in fore-aft.

19. The device of claim 13, wherein the position sensor senses fore-aft pitch angle.

20. The device of claim 13, further comprising:
a frame structure to which the first and second wheels are coupled; and
an inclination sensor that senses a fore-aft inclination of the frame structure;
wherein the control circuit is coupled to the inclination sensor and drives the motor based on data from the position sensor and the inclination sensor.

21. The device of claim 13, further comprising a continuous mechanical member that is driven by the one of the first and second wheels that is driven by the motor.

22. An auto-balance controlled transportation device, comprising:

a first wheel;
a second wheel, positioned forward or rearward of the first wheel;
a connecting frame to which the first and second wheels are coupled;
a rider platform that is movable in fore-aft pitch angle;
a motor assembly that is rotatable in fore-aft pitch angle, the motor assembly including a motor that drives at least one of the first and second wheels;
a position sensor that senses fore-aft pitch angle;
a control circuit coupled to the position sensor and the motor that drives the motor based on data from the position sensor; and
wherein the rider platform and the motor assembly are movably coupled to one another in a manner that facilitates fore-aft pitch angle movement of the rider platform relative to the connecting frame, this coupling arrangement includes at least one of:
the rider platform being slidable coupled to the connecting frame;
a slot through which a component of the coupling arrangement moves; and
a flexible portion coupled to or configured with the rider platform to afford fore-aft pitch angle movement thereof.

23. The device of claim 22, wherein the
rider platform and the motor assembly are coupled at a coupling axis and the flexible portion is positioned between a rider standing area of the rider platform structure and the coupling axis.

24. The device of claim 22, wherein the coupling arrangement is configured such that a change in the fore-aft pitch angle of the rider platform causes a greater change in the fore-aft pitch angle of the motor assembly.

25. The device of claim 22, wherein the rider platform is movable about a platform axis, the motor assembly is movable about a control axis, and the rider platform and the motor assembly are movably coupled to one another at a coupling axis; and
wherein the distance from the platform axis to the coupling axis, Dp, is greater than the distance from the control axis to the coupling axis, Dm.

26. The device of claim 22, further comprising
an inclination sensor that senses a fore-aft inclination of the connecting frame;
wherein the control circuit is coupled to the inclination sensor and drives the motor based on data from the position sensor and the inclination sensor.

27. The device of claim 26, wherein the control circuit drives the motor towards auto-balancing based on data from the position sensor that is offset by data from the inclination sensor.

28. An auto-balance controlled transportation device, comprising:
a first wheel;
a second wheel, positioned forward or rearward of the first wheel;
a connecting frame to which the first and second wheels are coupled;
a motor assembly including a motor that drives at least one of the first and second wheels, the motor assembly movable in fore-aft pitch angle about a control axis;
a rider platform coupled to the frame structure and movable in fore-aft pitch angle about a platform axis;
a position sensor that senses fore-aft pitch angle;
a control circuit, coupled to the position sensor, that drives the motor assembly based on data from the position sensor; and
a mechanical coupling arrangement through which the rider platform is movably coupled to the motor assembly, this coupling arrangement including a singular coupling axis that is mechanically positioned between the platform axis and the control axis.

29. The device of claim 28, wherein the distance from the platform axis to the singular coupling axis, Dp, is greater than the distance from the control axis to the singular coupling axis, Dm.

30. An auto-balance controlled transportation device, comprising:
a first wheel and a second wheel, one arranged forward of the other;
a motor that drives the first wheel;
a continuous mechanical member coupled to and about the first and second wheels and configured to translate rotational movement from the first wheel to the second wheel;
a rider platform that has a movable fore-aft pitch angle, movable about a platform axis;
a motor assembly that has a movable fore-aft pitch angle, movable about a control axis;
a position sensor that senses fore-aft pitch angle; and
a control circuit that drives the motor based on data from the position sensor;
wherein the rider platform and the motor assembly are movably coupled to one another at a coupling axis; and
wherein the distance from the platform axis to the coupling axis, Dp, is greater than the distance from the control axis to the coupling axis, Dm; and
wherein the coupling arrangement of the rider platform and the motor assembly is such that movement in fore-aft pitch angle of the rider platform causes a greater change in movement of the fore-aft pitch angle of the motor assembly.

31. The device of claim 30, wherein the movable coupling of the rider platform and the motor assembly is achieved by a mechanical linkage, and wherein the first wheel is a drive head wheel.

* * * * *